United States Patent [19]

Diebold et al.

[11] Patent Number: 5,993,533
[45] Date of Patent: Nov. 30, 1999

[54] CONTINUOUS WET TREATMENT PROCESS TO PREPARE DURABLE, HIGH GLOSS TITANIUM DIOXIDE PIGMENT

[75] Inventors: Michael P Diebold, Wilmington; Charles Robert Bettler, Newark, both of Del.; Phillip Martin Niedenzu, New Johnsonville; Anhtony John Coombe, McEwen, both of Tenn.; John Phillip Lanci, Sr., Long Beach, Miss.

[73] Assignee: E. I. du Pont de Nemours and Company, Wilmington, Del.

[21] Appl. No.: 09/110,046

[22] Filed: Jul. 2, 1998

[51] Int. Cl.[6] ........................................................ C09C 1/36
[52] U.S. Cl. ............................................ 106/442; 106/446
[58] Field of Search ...................................... 106/446, 442

[56] References Cited

U.S. PATENT DOCUMENTS 4,125,412  11/1978  West ......................................... 106/446
5,041,162  8/1991  Brand ....................................... 106/446

FOREIGN PATENT DOCUMENTS 73340  3/1983  European Pat. Off. ............... 106/446

*Primary Examiner*—C. Melissa Koslow

[57] ABSTRACT

A process is provided to prepare durable, high gloss titanium dioxide pigments by a continuous wet treatment process which involves curing of a silica coating at pH of between 7.0 and 8.5. Pigment prepared in this fashion is substantially free from $Al(OH)_3$ impurities and has excellent performance properties in high quality latex paint formulations.

14 Claims, No Drawings

CONTINUOUS WET TREATMENT PROCESS TO PREPARE DURABLE, HIGH GLOSS TITANIUM DIOXIDE PIGMENT

BACKGROUND OF THE INVENTION

1. Field of the Invention

This invention relates to an improved process for preparing titanium dioxide ($TiO_2$) pigments by continuous wet treatment, The $TiO_2$ pigments prepared by the process of this invention can be used to make latex paint formulations having improved properties such as gloss and zinc oxide (ZnO) stability.

2. Description of the Related Art

Processes to coat $TiO_2$ pigment with hydrous oxide coatings are well known. These processes typically involve precipitating the hydrous oxide coatings onto the pigment from salt solutions by controlling the pH of the solution, hence they are referred to as "wet treatment". Wet treatment is most frequently performed in a batch process wherein considerable residence times are needed to achieve durable coatings on the pigment.

A first step in these processes often involves preparing an aqueous slurry of $TiO_2$ pigment particles and adjusting the pH of the slurry to about 9 or above, as described in Brand, U.S. Pat. No. 5,041,162. Brand describes a batch process for preparing a $TiO_2$ pigment coated with silica and alumina comprising the steps of: a) adjusting the pH of the slurry to at least 9.8 and heating the slurry to 75–95° C.; b) adding a soluble silicate to the slurry: c) adjusting the pH in two steps, first, rapidly adjusting the pH to 9.2–9.4 to complete deposition and cure of silica and second, rapidly adjusting the pH to 2.8–3.2; c) adding a soluble aluminate to raise the pH to 5.5–6.5 to initiate deposition of alumina coating; and continuing aluminate addition at a pH of 5.5–6.5; e) adjusting the pH to 6.5–8.5; and f) recovering the coated $TiO_2$ pigment.

West, U.S. Pat. No. 4,125,412, provides a continuous process for wet treatment of $TiO_2$ pigments which comprises: a) heating a $TiO_2$ pigment slurry to 80–100° C.; b) adding sodium silicate to the slurry; c) adjusting the pH to 9 to 10.5 and adjusting temperature to 85–95° C. for 15–60 minutes to provide a silica coating; d) simultaneously adding sodium aluminate and acid at pH 8 to 9 to provide an alumina coating; d) curing the aluminate treated slurry for up to 30 minutes; e) adjusting the pH to 7; and e) filtering, washing and drying. Optionally pH is adjusted to 9 to 10.5 prior to the addition of the sodium silicate to the slurry in step b). However, it has been found that the pigments prepared by the West process suffer from poor zinc oxide stability and certain latex paint formulations made with such pigments have low gloss.

Brand, EP 73340 A, describes a continuous wet treatment process which involves: a) adding a soluble silicate to a $TiO_2$ pigment slurry at a temperature of at least 85° C., and a pH of 9.8 to 10.1 to form a dense silica coating; b) neutralizing the slurry in at least 3 steps by adding acid to lower the pH to 9.6–9.8, then 9.2–9.4, and finally to 3–4; c) raising the pH of the slurry to 5.0–6.5; (d) adding an alumina source to form a hydrous alumina coating; and (e) neutralizing the slurry and recovering the pigment. This patent teaches that control of pH as described is a critical element to precipitation of the silica coating.

Prior to the present invention, pigments made via continuous wet treatment processes have been found to be inferior to those made in conventional batch wet treatment processes. It is well known that continuous processes are economically more attractive than batch treatment processes. In a continuous process, treatment times can be greatly reduced and thus increase productivity without the need for capital investment. The present invention provides a continuous process that raises the level of performance of the pigment product to those of batch processes.

SUMMARY OF THE INVENTION

This invention provides in a process for the continuous wet treatment of titanium dioxide pigment particles, comprising the steps of:

(a) heating a slurry of $TiO_2$ pigment particles to a temperature in the range of 80 to 100° C., (b) adding a water-soluble silica source to the slurry, (c) curing the slurry within the temperature range of 80 to 100° C. to provide a silica-treated slurry, (d) adding a water-soluble alumina source to the silica-treated slurry, (e) curing the slurry within the temperature range of 80 to 100° C. to provide an alumina-treated slurry, (f) recovering the pigment particles from the alumina-treated slurry, the improvement comprising, wherein in step (c), the slurry is cured in at least two stages such that in the first stage the pH is maintained in the range of 9.0 to 10.5, and in the final stage the pH is maintained in the range of 7.0 to 8.5.

In this process, the $TiO_2$ pigment is coated with silica in an amount ranging from 1 to 10 wt %, preferably 1.5 to 6.5 wt %, and with alumina in an amount ranging from 1 to 4 wt %, preferably 1.4 to 3.5 wt %, based on total coated $TiO_2$ pigment weight. The silica source and the alumina source may be added to the $TiO_2$ slurry in a pipeline reactor, preferably in a zone of turbulence. This provides effective mixing to allow an effective coating of the hydrous oxide on the $TiO_2$ pigment particles.

Optionally, in this process, the initial pH of the slurry, before adding the water-soluble silica source, is adjusted to pH of less than 9.0, preferably to pH of 4 to 8. Preferably in the silica curing step, in the first stage, the slurry is cured with a residence time of not less than 30 minutes, preferably 30 to 120 minutes; and in the final stage, the slurry is cured with a residence time of not less than 45 minutes, preferably 60 to 180 minutes. More preferably the silica curing step is performed in two stages wherein the second stage is the final stage.

In the alumina curing step, the slurry may be cured at a pH of 7.0 to 9.5, preferably at a residence time of not less than 15 minutes, more preferably with a residence time of 30 to 180 minutes. The alumina curing step may occur in more than one stage, for example, in two stages, wherein in the first stage, the slurry is cured with a residence time of 30 to 180 minutes and wherein in the second stage, the slurry is cured with a residence time of 15 to 180 minutes at a pH of 4.5 to 9.0. In the event only a single stage is used for alumina curing, there is an optional step of adjusting pH to 4.5 to 9.0 after the curing stage. During and/or after the alumina curing, the slurry may be optionally cooled to a temperature of less than 70° C.

This invention also provides a $TiO_2$ pigment prepared by the process of this invention wherein the $TiO_2$ pigment is substantially free from alumina trihydrate, $Al(OH)_3$. It has been found that the presence of $Al(OH)_3$ is detrimental in high performance latex paints. This invention also provides a latex paint comprising the $TiO_2$ prepared by the process of this invention wherein the latex paint has a HG-74 gloss value of greater than 50.

DETAILED DESCRIPTION OF THE INVENTION

The present invention relates to an improved process for preparing titanium dioxide ($TiO_2$) pigments by continuous wet treatment.

Conventional base $TiO_2$ pigment particles may be used to produce the $TiO_2$ pigments of this invention. Generally, base $TiO_2$ particles are commercially manufactured by either the "chloride" or "sulfate" process. The base $TiO_2$ particles used in this invention should have a substantially rutile crystalline structure. Preferably, base $TiO_2$ particles made by the chloride process with a particle size in the range of about 100 to about 500 nm (0.1 to 0.5 microns) are used in the present invention. In the chloride process, titanium tetrachloride ($TiCl_4$) is oxidized in the vapor phase with an oxygen-containing gas to produce a hot gaseous-suspension of $TiO_2$ solid particulate. Aluminum chloride ($AlCl_3$) is typically mixed with the $TiCl_4$ prior to oxidizing the $TiCl_4$. The $AlCl_3$ becomes incorporated on the surfaces of the $TiO_2$ particles as aluminum oxide ($Al_2O_3$). The amount of $AlCl_3$ added is sufficient to provide about 0.5 to about 1.5% by weight $Al_2O_3$. This gaseous-suspension then rapidly cooled to provide the base $TiO_2$ pigment particles. In the alternative sulfate process, titanium ore is dissolved into sulfuric acid which is then filtered to remove any insoluble metal sulfates. The resulting mixture of aqueous titanyl sulfate and ferrous sulfate is cooled and the ferrous sulfate precipitates out. The titanyl sulfate is hydrolyzed to titanium hydroxide which is subsequently calcined to produce the base $TiO_2$ pigment particles.

An aqueous slurry of the base $TiO_2$ particles is then prepared. Typically, the concentration of $TiO_2$ particles is 300 to 450 grams per liter of slurry. The slurry is heated to a temperature in the range of 80 to 100° C. and fed continuously to a reaction system, typically a pipeline reactor. Preferably, the pH of the slurry is maintained at below 9, and more preferably in the range of 4 to 8. If the pH of the slurry is adjusted to above 9 or less than 4, the alumina on the surfaces of the $TiO_2$ particles may slightly dissolve. In addition, it has been found that the formation of trihydrate alumina, $Al(OH)_3$ can be significantly reduced by maintaining the slurry at a pH of less than 9. Trihydrate alumina may adversely affect pigment properties such as gloss, dispersion and abrasion. Surprisingly it has been found that by maintaining the pH at less than 9, and subsequently treating the pigment with a water-soluble silica source using the process of this invention, a durable $TiO_2$ pigment can be produced.

An aqueous solution of a water-soluble silica source is added to the heated slurry in the reaction system, through a zone of turbulence which may be created by an in-line mixer or other suitable means. The silica source is typically an alkali metal silicate, preferably sodium or potassium silicate. The amount of sodium silicate added can be such that the final pigment product contains 1 to 10 wt % silica, preferably 1.5 to 6.5 wt % silica, based on total coated $TiO_2$ pigment weight.

After adding the silica source to the $TiO_2$ slurry, the slurry is cured in at least 2 stages, preferably 2 stages. Curing is defined herein to mean maintaining the slurry under such conditions so that the hydrous oxide (silica or alumina) will deposit on the $TiO_2$ pigment particles. In the first stage, the slurry is continuously fed to a first silica cure tank wherein the residence time is not less than 30 minutes. Concentrated acid, such as HCl or $H_2SO_4$ is added to the cure tank to maintain the pH in a range of 9.0 to 10.5. Preferably the residence time in the first stage is 30 to 120 minutes. The initially cured slurry is fed from the first silica cure tank to a second silica cure tank, which may also be the final silica cure tank when silica curing is performed in two stages. In the final silica cure tank, concentrated acid is added to maintain the pH in a range of 7.0 to 8.5. It has been surprisingly found that when the pH is maintained in the range of 7.0 to 8.5 in the final silica cure tank, there is provided a pigment that when incorporated into a latex paint shows improvements in such properties as gloss and zinc oxide stability. The residence time in the final silica cure tank is not less than 45 minutes, preferably 60 to 180 minutes. Additional silica cure tanks may be used so long as the minimum residence times specified in the first and final stages are met.

The silica coated—$TiO_2$ slurry is fed from the final silica cure tank through a zone of turbulence, such as an in-line mixer where a water-soluble alumina source is added. The alumina source is typically an alkali metal aluminate, such as sodium or potassium aluminate, or a cationic alumina source such as aluminum sulfate or aluminum chloride. Preferably the water soluble alumina source is an alkali metal aluminate, more preferably sodium aluminate. Sufficient acid or base (such as caustic) is simultaneously added to the zone of turbulence either before or after the water-soluble alumina source to provide a pH after reaction of 7.0 to 9.5. The amount of alumina source added can be such that the final pigment product contains 1 to 4 wt % alumina, preferably 1.4 to 3.5 wt % alumina, based on the total coated $TiO_2$ pigment weight.

The slurry treated with the alumina source is then cured by feeding to an alumina cure tank at a temperature of 80 to 100° C. Concentrated acid, such as HCl or $H_2SO_4$, or base, such as caustic, is added as needed to the tank to maintain a pH of 7.0 to 9.5. The alumina curing step is typically performed with a residence time of not less than 15 minutes, preferably 30 to 180 minutes. The number of cure tanks is not critical. The alumina curing may occur in more than one stage, by feeding the slurry to one or more additional alumina cure tanks. Should multiple cure tanks be used, it is preferred that the pH be adjusted to 4.5 to 9.0 by adding acid or base as needed in the final cure tank. Should a single cure tank be used, an additional preferred step is to adjust the pH after curing to 4.5 to 9.0. Optionally the slurry may be cooled in the final alumina cure tank to a temperature of less than 70° C.

To effect recovery, the resulting pigment is then separated from the liquid by filtration or centrifugation. The pigment may be washed with deionized water or water until substantially free from salts. The pigment product is dried then subjected to grinding to achieve the desired particle size.

$TiO_2$ pigments prepared by the process of this invention have been found to be substantially free from alumina trihydrate, $Al(OH)_3$, By substantially free from $Al(OH)_3$, it is meant that no $Al(OH)_3$ can be detected by the analytical process described below. The detection limits of the process are 50 ppm. As stated above, the presence of $Al(OH)_3$ in $TiO_2$ pigments is believed to adversely affect pigment properties such as gloss, dispersion and abrasion. Such $TiO_2$ pigments are useful in high performance latex paints. In particular, in such latex paints comprising the $TiO_2$ pigment prepared by the process of this invention, the paints have high gloss, HG-74 gloss of greater than 50 as well as good ZnO stability. ZnO stability may be used as an indicator of the shelf life of a paint, that is, the period of time prior to gelling of the paint.

Test Methods $Al(OH)_3$ content is measured using the thermogravimetric analysis (TGA) method. A small sample of pigment is heated at a constant rate of 10° C. per minute from room temperature to 700° C. The presence of $Al(OH)_3$ is indicated by a sharp weight loss between 265 and 285° C. This weight loss is converted to % $Al(OH)_3$ in the pigment by assuming one and one half molecules of water evolve per atom of aluminum.

Acid solubility is measured by digesting a predetermined quantity of coated pigment in suluric acid and spectrophotometrically comparing it to a standard $TiO_2$ sample similarly treated. The standard spectrophotometric curve is prepared by dissolving 15 g of ammonium sulfate and 1.0118 g of $TiO_2$, containing 98.83% by weight $TiO_2$, in 20 ml of 66° Be. sulfuric acid and diluting to 800 ml with water. 80 ml of the sulferic acid solution is then added to this solution. After allowing the resulting solution to cool to room temperature, it is diluted to one liter with water. The solution contains 0.001 g of $TiO_2$ per nil and should be allowed to stand for one week before using.

Samples of 2, 4, 6 and 8 ml of the above-prepared standard solution are each mixed with 10 ml of 30% hydrogen peroxide and diluted to 100 ml with 10% sulfuric acid. After standing for one hour, the absorbance of these solutions is read using a spectrophotometer against a reference solution, prepared by diluting 10 ml of 30% hydrogen peroxide to 100 ml with 10% sulfuric acid at 400 m$\mu$ using 100 mm cells. A plot of titanium peroxide concentration in mg/l optical density is made for these samples.

To determine acid solubility of the coated $TiO_2$ pigments, 0.2000 g of coated $TiO_2$ pigment is added with stirring to 10 ml 66° Be. sulfuric acid at 175° C. The pigment is digested at 175° C. for 1 hour. After digestion the sample is quenched by pouring into crushed ice, made from distilled water. The sample is diluted to 100 ml with water and filtered. 10 ml of the filtrate is mixed with 2 ml of 30% hydrogen peroxide and diluted to 25 ml with 10% sulfuric acid. After 1 hour the absorbance of the sample is read against a reference solution, prepared by diluted 2 ml of 30% hydrogen peroxide to 25 ml with 10% sulfuric acid.

The concentration of soluble $TiO_2$ is determined from the above-prepared standard spectrophotometric curve from the measured optical density and the percent soluble $TiO_2$, i.e., the acid solubility, is calculated by dividing the concentration of soluble $TiO_2$ by 8.

Particle size in microns is determined by a Horiba LA-900 laser-scattering 10 particle size analyzer (available from Horiba Instruments, Inc., Irvine, Calif.).

Emulsion (TFW-182) Gloss is determined by preparing an emulsion paint formulation using a slurry sample, making drawdowns of the paint on black PVC panels, drying the panels for 3 hours in a constant temperature, constant humidity (CTCH) cabinet, measuring 60 degree gloss using a Hunter gloss meter, and calculating gloss in relation to reflectance values of standards.

HG-74 gloss is determined using a latex paint is made with a commercially available emulsion resin supplied by Rohm and Haas under the name Rhoplex® HG74M. This is a small size, high quality resin suitable for latex paints requiring the highest levels of gloss. Paints are drawn down on a black PVC panel and oven dried. A Hunter gloss meter is used to compare 60° gloss of the sample paint to those of high and low gloss standards. Adjusted gloss values in excess of 50 are desired.

ZnO stability is measured by incorporating the pigment into a proprietary latex paint which contains a significant amount of zinc oxide and which has been specifically formulated so that viscosity stability is especially sensitive to the nature of the $TiO_2$ pigment employed. The paint is then aged in a 140° F. oven for several weeks. Viscosity is measured weekly and compared to the viscosity measured shortly after paint was produced. Performance is based on the increase in viscosity after aging for five weeks. Increases above 20 Krebs Units are considered unacceptable.

EXAMPLES

Comparative Example A

A slurry of highly deagglomerated rutile $TiO_2$ containing 1% cooxidized alumina, with a pH of about 4.0 and a solids concentration of about 450 g/l was collected in a blend tank. The raw slurry was heated to about 95° C. and diluted to about 335 grams $TiO_2$ per liter of slurry and the pH was adjusted with caustic to 9.0. The slurry was fed continuously through a pipeline at a rate of about 20 tons/hour through a first in-line mixer where sufficient sodium silicate (about 400 g/l $SiO_2$) was added to the mixer to give about 3% $SiO_2$ by weight $TiO_2$.

The slurry was continuously fed to a silica cure tank with a residence time of about 45 minutes. Concentrated (22–32%) HCl was added to the top of the tank to maintain a pH of about 9.5 to 9.7.

The initial silica cured slurry was fed continuously to a second silica cure tank with a residence time of about 150 minutes and maintained at a pH of about 9.7. The doubly cured slurry was fed through a second in-line mixer where about 450 g/l sodium aluminate was added at a rate to give an additional 2.3% $Al_2O_3$ by weight $TiO_2$. Sufficient concentrated HCl was simultaneously added to the bottom of the mixer (before the aluminate) to provide a pH after reaction of about 8.5.

The silica/alumina treated slurry was continuously fed to a third cure tank with a residence time of about 90 minutes. Acid or caustic was added as needed to maintain the pH between 8.3 and 8.8.

The cured slurry was fed to a fourth cure tank with a residence time of about 60 minutes where it was cooled with process water to about 70° C. and the pH was adjusted to 4.8–5.2 using concentrated HCl. The slurry was filtered, washed, dried and fluid energy milled. Results and performance properties are presented in the Table below.

Comparative Example B

A slurry of highly deagglomerated rutile $TiO_2$ containing 1% cooxidized alumina, with a pH of about 4.0 and a solids concentration of about 450 g/l was collected in a blend tank. The raw slurry was heated to about 95° C. and diluted to about 350 grams $TiO_2$ per liter of slurry. The slurry was fed continuously through a pipeline at a rate of about 20 tons/hour through a first in-line mixer where sufficient sodium silicate (about 400 g/l $SiO_2$) was added to the mixer to give about 3% $SiO_2$ by weight $TiO_2$.

The slurry was continuously fed to a silica cure tank with a residence time of about 45 minutes. Concentrated (22–32%) HCl was added to the top of the tank to maintain a pH of about 9.5 to 9.7.

The initial silica cured slurry was fed continuously to a second silica cure tank with a residence time of about 150 minutes and maintained at a pH of about 9.7. The doubly cured slurry was fed through a second in-line mixer where about 450 g/l sodium aluminate was added at a rate to give an additional 1.3% $Al_2O_3$ by weight $TiO_2$. Sufficient concentrated HCl was simultaneously added to the bottom of the mixer (before the aluminate) to provide a pH after reaction of about 8.5.

The silica/alumina treated slurry was continuously fed to a third cure tank with a residence time of about 90 minutes.

Acid or caustic was added as needed to maintain the pH between 8.3 and 8.8.

The cured slurry was fed to a fourth cure tank with a residence time of about 60 minutes where it was cooled with process water to about 70° C. and the pH was adjusted to 4.8–5.2 using concentrated HCl. The slurry was filtered, washed, dried and fluid energy milled. Results and performance properties are presented in the Table below.

Example 1

A slurry of highly deagglomerated rutile $TiO_2$ containing 1% cooxidized alumina, with a pH of about 4.0 and a solids concentration of about 450 g/l was collected in a blend tank. The raw slurry was heated to about 95° C. and diluted to about 375 grams $TiO_2$ per liter of slurry. The slurry was fed continuously through a pipeline at a rate of about 19.5 tons/hour through a first in-line mixer where sufficient sodium silicate (about 400 g/l $SiO_2$) was added to the mixer to give about 3% $SiO_2$ by weight $TiO_2$.

The slurry was continuously fed to a silica cure tank with a residence time of about 45 minutes. Concentrated (22–32%) HCl was added to the top of the tank to maintain a pH of about 9.5 to 10.0.

The initial silica cured slurry was fed continuously to a second silica cure tank with a residence time of about 150 minutes and HCl was added to the top of this tank to maintain at a pH of between 8.3 and 8.5. The doubly cured slurry was fed through a second in-line mixer where about 450 g/l sodium aluminate was added at a rate to give an additional 1.5% $Al_2O_3$ by weight $TiO_2$. Sufficient concentrated HCl was simultaneously added to the bottom of the mixer (before the aluminate) to provide a pH after reaction of about 7.0.

The silica/alumina treated slurry was continuously fed to a third cure tank with a residence time of about 90 minutes. Acid or caustic was added as needed to maintain the pH between 6.8 and 7.3.

The cured slurry was fed to a fourth cure tank with a residence time of about 60 minutes where it was cooled with process water to about 70° C. and the pH was adjusted to 4.6–5.0 using concentrated HCl. The slurry was filtered, washed, dried and fluid energy milled. Results and performance properties are presented in the Table below.

Example 2

A slurry of highly deagglomerated rutile $TiO_2$ containing 1% cooxidized alumina, with a pH of about 4.0 and a solids concentration of about 450 g/l was collected in a blend tank. The raw slurry was heated to about 95° C. and diluted to about 325 grams $TiO_2$ per liter of slurry. The slurry was fed continuously through a pipeline at a rate of about 21 tons/hour through a first in-line mixer where sufficient sodium silicate (about 400 g/l $SiO_2$) was added to the mixer to give about 3% $SiO_2$ by weight $TiO_2$.

The slurry was continuously fed to a silica cure tank with a residence time of about 45 minutes. Concentrated (22–32%) HCl was added to the top of the tank to maintain a pH of about 9.5 to 10.0.

The initial silica cured slurry was fed continuously to a second silica cure tank with a residence time of about 150 minutes and concentrated HCl was added to the top of this tank to maintain a pH of between 6.8 and 7.2. The doubly cured slurry was fed through a second in-line mixer where about 450 g/l sodium aluminate was added at a rate to give an additional 1.5% $Al_2O_3$ by weight $TiO_2$. Sufficient concentrated HCl was simultaneously added to the bottom of the mixer (before the aluminate) to provide a pH after reaction of about 7.0.

The silica/alumina treated slurry was continuously fed to a third cure tank with a residence time of about 90 minutes. Acid or caustic was added as needed to maintain the pH between 6.8 and 7.3.

The cured slurry was fed to a fourth cure tank with a residence time of about 60 minutes where it was cooled with process water to about 70° C. and the pH was adjusted to 4.6–5.0 using concentrated HCl. The slurry was filtered, washed, dried and fluid energy milled. Results and performance properties are presented in the Table below.

Example 3

A slurry of highly deagglomerated rutile $TiO_2$ containing 1% cooxidized alumina, with a pH of about 4.0 and a solids concentration of about 450 g/l was collected in a blend tank. The raw slurry was heated to about 95° C. and diluted to about 325 grams $TiO_2$ per liter of slurry. The slurry was fed continuously through a pipeline at a rate of about 21 tons/hour through a first in-line mixer where sufficient sodium silicate (about 400 g/l $SiO_2$) was added to the mixer to give about 3% $SiO_2$ by weight $TiO_2$.

The slurry was continuously fed to a silica cure tank with a residence time of about 45 minutes. Concentrated (22–32%) HCl was added to the top of the tank to maintain a pH of about 9.5 to 10.0.

The initial silica cured slurry was fed continuously to a second silica cure tank with a residence time of about 150 minutes and concentrated HCl was added to the top of this tank to maintain a pH of between 6.8 and 7.2. The doubly cured slurry was fed through a second in-line mixer where about 450 g/l sodium aluminate was added at a rate to give an additional 2.0% $Al_2O_3$ by weight $TiO_2$. Sufficient concentrated HCl was simultaneously added to the bottom of the mixer (before the aluminate) to provide a pH after reaction of about 7.0.

The silica/alumina treated slurry was continuously fed to a third cure tank with a residence time of about 90 minutes. Acid or caustic was added as needed to maintain the pH between 6.8 and 7.3.

The cured slurry was fed to a fourth cure tank with a residence time of about 60 minutes where it was cooled with process water to about 70° C. and the pH was adjusted to 4.6–5.0 using concentrated HCl. The slurry was filtered, washed, dried and fluid energy milled. Results and performance properties are presented in the Table below.

TABLE

| Property | Ex. A | Ex. B | Ex. 1 | Ex. 2 | Ex. 3 |
| --- | --- | --- | --- | --- | --- |
| Raw slurry pH | 9.0 | 4.0 | 4.0 | 4.0 | 4.0 |
| Final silica cure pH | 9.7 | 9.7 | 8.5 | 7.0 | 7.0 |
| $Al(OH)_3$, ppm | 2190 | N/D | N/D | N/D | N/D |
| % $Al_2O_3$ | 2.59 | 2.28 | 2.47 | 2.49 | 3.03 |
| Acid Solubility | 4.3 | 5.4 | 5.0 | 6.0 | 5.4 |
| % >0.5 μ | 23.3 | 17.6 | 17.4 | | 13.8 |
| Gloss (TFW-182) | 65 | 63 | 69 | 65 | 67 |
| Gloss (HG-74) | 38 | 43 | 57 | 55 | 56 |
| ZnO Stability | 32 | >50 | 7 | 3 | −1 |

HG-74 gloss and ZnO stability are important performance parameters in modern high quality latex paints and in ZnO containing latex paints. As can be seen from the Table, there are significant improvements in HG-74 gloss and ZnO stability, as well as elimination of $Al(OH)_3$ in the product, when $TiO_2$ pigments are prepared in accordance with the continuous wet treatment process of this invention, relative to other continuous wet treatment processes. In particular, in a continuous wet treatment process in which the initial $TiO_2$ slurry pH is not raised to above 9, the undesirable $Al(OH)_3$ is not formed. Surprisingly, and contrary to previous reports, there is no detrimental affect on durability as measured by acid solubility when the initial $TiO_2$ slurry pH is not raised above 9. In addition, by maintaining the final silica deposition cure pH between about 7 and 8.5, rather than at or above about 9.5 as described in previous continuous processes, excellent performance in HG-74 gloss paints and ZnO containing latex paints is assured.

We claim:

1. In a process for the continuous wet treatment of titanium dioxide pigment particles, comprising the steps of:
   (a) heating a slurry of $TiO_2$ pigment particles to a temperature in the range of 80 to 100° C.,
   (b) adding a water-soluble silica source to the slurry,
   (c) curing the slurry within the temperature range of 80 to 100° C. to provide a silica-treated slurry,
   (d) adding a water-soluble alumina source to the silica-treated slurry,
   (e) curing the slurry within the temperature range of 80 to 100° C. to provide an alumina-treated slurry,
   (f) recovering the pigment particles from the alumina-treated slurry, the improvement comprising,
   wherein in step (c), the slurry is cured in at least two stages such that in the first stage the pH is maintained in the range of 9.0 to 10.5, and in the final stage the pH is maintained in the range of 7.0 to 8.5.

2. The process of claim 1 wherein in step (b), the water-soluble silica source is added in an amount to provide 1 to 10 wt % silica and wherein in step (d), the water-soluble alumina source is added in an amount to provide 1 to 4 wt % alumina.

3. The process of claim 1 wherein the silica source and alumina source are added to the $TiO_2$ slurry in a pipeline reactor in a zone of turbulence.

4. The process of claim 1 wherein the pH of the slurry is adjusted to a pH of less than 9.0 before adding the water-soluble silica source in step (b).

5. The process of claim 4 wherein the pH of the slurry is adjusted to a pH of 4 to 8 before adding the water-soluble silica source in step (b).

6. The process of claim 1 wherein in step (c) in the first stage, the slurry is cured with a residence time of not less than 30 minutes, and wherein in the final stage, the slurry is cured with a residence time of not less than 45 minutes.

7. The process of claim 6 wherein in step (c), in the first stage, the slurry is cured with a residence time of 30 to 120 minutes, and wherein in the final stage, the slurry is cured with a residence time of 60 to 180 minutes.

8. The process of claim 1 wherein in step (e), the slurry is cured at a pH of 7.0 to 9.5 with a residence time of not less than 15 minutes.

9. The process of claim 8 wherein in step (e), the slurry is cured with a residence time of 30 to 180 minutes.

10. The process of claim 1 wherein in step (e), the slurry is cured in two stages wherein in the first stage, the slurry is cured at a pH of 7.0 to 9.5 with a residence time of 15 to 180 minutes and wherein in the second stage the slurry is cured at a pH of 4.5 to 9.0 with a residence to of 15 to 180 minutes.

11. The process of claim 1, 8 or 9, wherein in step (e), the slurry is cured in one stage and wherein the pH is adjusted after step (e) and prior to step (f) to a pH of 4.5 to 9.0.

12. The process of claim 1, wherein in the final alumina cure stage, the slurry is cooled to a temperature of less than 70° C.

13. A $TiO_2$ pigment prepared by the process of claim 1, wherein the pigment is substantially free from $Al(OH)_3$.

14. A latex paint comprising the $TiO_2$ pigment of claim 13, having an HG-74 gloss value of greater than 50.

* * * * *